US007252620B2

(12) United States Patent
Kiuchi

(10) Patent No.: US 7,252,620 B2
(45) Date of Patent: Aug. 7, 2007

(54) CONTROL OF VEHICLE DRIVE SYSTEM

(75) Inventor: Hiroyuki Kiuchi, Zama (JP)

(73) Assignee: Nissan Motor Co., Ltd, Yokohama-shi (JP)

( * ) Notice: Subject to any disclaimer, the term of this patent is extended or adjusted under 35 U.S.C. 154(b) by 277 days.

(21) Appl. No.: 11/135,403

(22) Filed: May 24, 2005

(65) Prior Publication Data

US 2005/0261112 A1 Nov. 24, 2005

(30) Foreign Application Priority Data

May 24, 2004 (JP) ............................ 2004-153006

(51) Int. Cl.
*F16H 61/58* (2006.01)
*B60W 10/02* (2006.01)
*G06F 7/00* (2006.01)

(52) U.S. Cl. .............................. 477/62; 477/5; 701/67

(58) Field of Classification Search .................... 477/5, 477/174, 175, 180, 53, 62, 64, 70; 192/3.28; 701/67

See application file for complete search history.

(56) References Cited

U.S. PATENT DOCUMENTS 6,317,665 B1 * 11/2001 Tabata et al. ................. 701/67
6,668,224 B2 * 12/2003 Kawai et al. ................. 701/67
2003/0033068 A1 2/2003 Kawai et al.
2003/0050150 A1 * 3/2003 Tanaka et al. ................ 477/62
2005/0003928 A1 * 1/2005 Niki et al. ..................... 477/5

FOREIGN PATENT DOCUMENTS

JP 2000-274290 A 10/2000
JP 2001-082204 A 3/2001
JP 2002-248935 A 9/2002
JP 2004-137963 A 5/2004

* cited by examiner

*Primary Examiner*—Roger Pang
(74) *Attorney, Agent, or Firm*—Foley & Lardner LLP

(57) ABSTRACT

An air compressor (12*b*) starts to operate when fuel to an internal combustion engine (1) is cut off and the engine (1) and a transmission (4) are directly engaged. Upon receiving a drive request signal, a controller (21) outputs a lockup clutch disengaging request. The controller (21) resumes fuel supply and starts driving of the air compressor (12*b*) only when it is confirmed that the lockup clutch (3) has been disengaged, thereby preventing a recovery shock from generating due to resumption of fuel supply during the lockup clutch (3) being in the engaged state.

10 Claims, 6 Drawing Sheets

11 FUEL INJECTOR
31 ACCELERATOR PEDAL DEPRESSION SENSOR
32-34 ROTATION SPEED SENSOR
35 VEHICLE SPEED SENSOR
36 EXTERNAL TEMPERATURE SENSOR
37 CABIN TEMPERATURE SENSOR
38 TEMPERATURE SETTING DEVICE

CONTROL OF VEHICLE DRIVE SYSTEM

FIELD OF THE INVENTION

This invention relates to drive force control of a vehicle, which comprises an engine that allows fuel cut and a transmission that is integrally connected to the engine via a lockup clutch.

BACKGROUND OF THE INVENTION

JP2001-082204A published in the year 2001 by the Japan Patent Office proposes to cut down fuel supply, namely cut fuel to the engine from a fuel supply device to economize vehicle fuel consumption when a vehicle internal-combustion engine is forced to rotate faster than a predetermined rotation speed due to the inertial force of the moving vehicle, namely in an engine braking state. If an engine rotation speed falls below a predetermined rotation speed due to the fuel cut, fuel supply is resumed.

Among vehicles configured to connect the engine and the transmission via a torque converter, there is a vehicle that allows the lockup clutch to directly connect the engine and the transmission in response to a running condition, so as to suppress fuel consumption.

If the above prior art is applied to such a vehicle and fuel supply is resumed with the lockup clutch being in an engaged state, an output torque of the engine rapidly increases and is directly transmitted to the transmission via the lockup clutch due to resume of fuel supply, namely a torque shock called a recovery shock is generated, thereby imposing discomfort on a driver and a passenger(s).

If the lockup clutch enters a disengaged state at a faster engine rotation speed than that needed for resuming fuel supply, the lockup clutch does not perform torque transmittance when fuel supply is resumed. A recovery shock does not generate since fluid in the torque converter absorbs changes in the torque.

SUMMARY OF THE INVENTION

When an air compressor of a vehicle air conditioner is driven by the engine, the load on the engine varies according to the driving of the air compressor. To cut fuel, it is preferable to set an engine rotation speed for resuming fuel supply while the air compressor is not driven to be lower than that for resuming fuel supply while the air compressor is driven in view of saving fuel. Similarly for the engine rotation speed for disengaging the lockup clutch, it is preferable to set an engine rotation speed for disengaging the lockup clutch while the air compressor is not driven to be lower than that for disengaging the lockup clutch while the air compressor is driven.

Studies conducted by the inventors have shown that even in a vehicle configured to disengage the lockup clutch at a higher engine rotation speed than that for resuming fuel supply, a recovery shock may still generate when starting the air compressor in a non-driven state during the time of lowering the engine rotation speed in an engine braking state.

In other words, when a startup instruction for the air compressor is issued while the engine rotation speed is being lowered from an engine rotation speed for cutting fuel to that for resuming fuel supply with the lockup clutch being in an engaged state, the lockup clutch is immediately disengaged, and fuel supply is resumed. At this time, although fuel supply can be immediately resumed, disengagement of the lockup clutch takes some time. As a result, since fuel supply is resumed before the lockup clutch is disengaged, a recovery shock may be generated.

It is therefore an object of this invention to prevent generation of a recovery shock even when fuel is cut and the air compressor is started with the lockup clutch being in an engaged state.

In order to achieve the above object, this invention provides control device for such a drive system of a vehicle that comprises an engine, a transmission, a torque converter which transmits an output torque of the engine to the transmission via a fluid, a lockup clutch which operates between an engaged state in which the engine and the transmission are directly engaged and a disengaged state in which the engine and the transmission are not directly engaged, an accessory driven by the engine in response to an accessory drive request signal, and a fuel supply device which performs and cuts off fuel supply to the engine according to a running condition of the vehicle.

The control device comprises a programmable controller programmed to operate, when the accessory drive request signal has been generated in a state where the fuel supply is cut off and the lockup clutch is in the engaged state, the lockup clutch to enter the disengaged state, determine whether or not the lockup clutch has been in the disengaged state, and control the engine to start driving the accessory and control the fuel supply device to resume fuel supply, only when the lockup clutch has been in the disengaged state.

This invention also provides a control method of the drive system. The method comprises operating, when the accessory drive request signal has been generated in a state where the fuel supply is cut off and the lockup clutch is in the engaged state, the lockup clutch to enter the disengaged state, determining whether or not the lockup clutch has been in the disengaged state, and controlling the engine to start driving the accessory and controlling the fuel supply device to resume fuel supply, only when the lockup clutch has been in the disengaged state.

BRIEF DESCRIPTION OF THE DRAWINGS

The details as well as other features and advantages of this invention are set forth in the remainder of the specification and are shown in the accompanying drawings.

DESCRIPTION OF THE PREFERRED EMBODIMENTS

Figure 1:
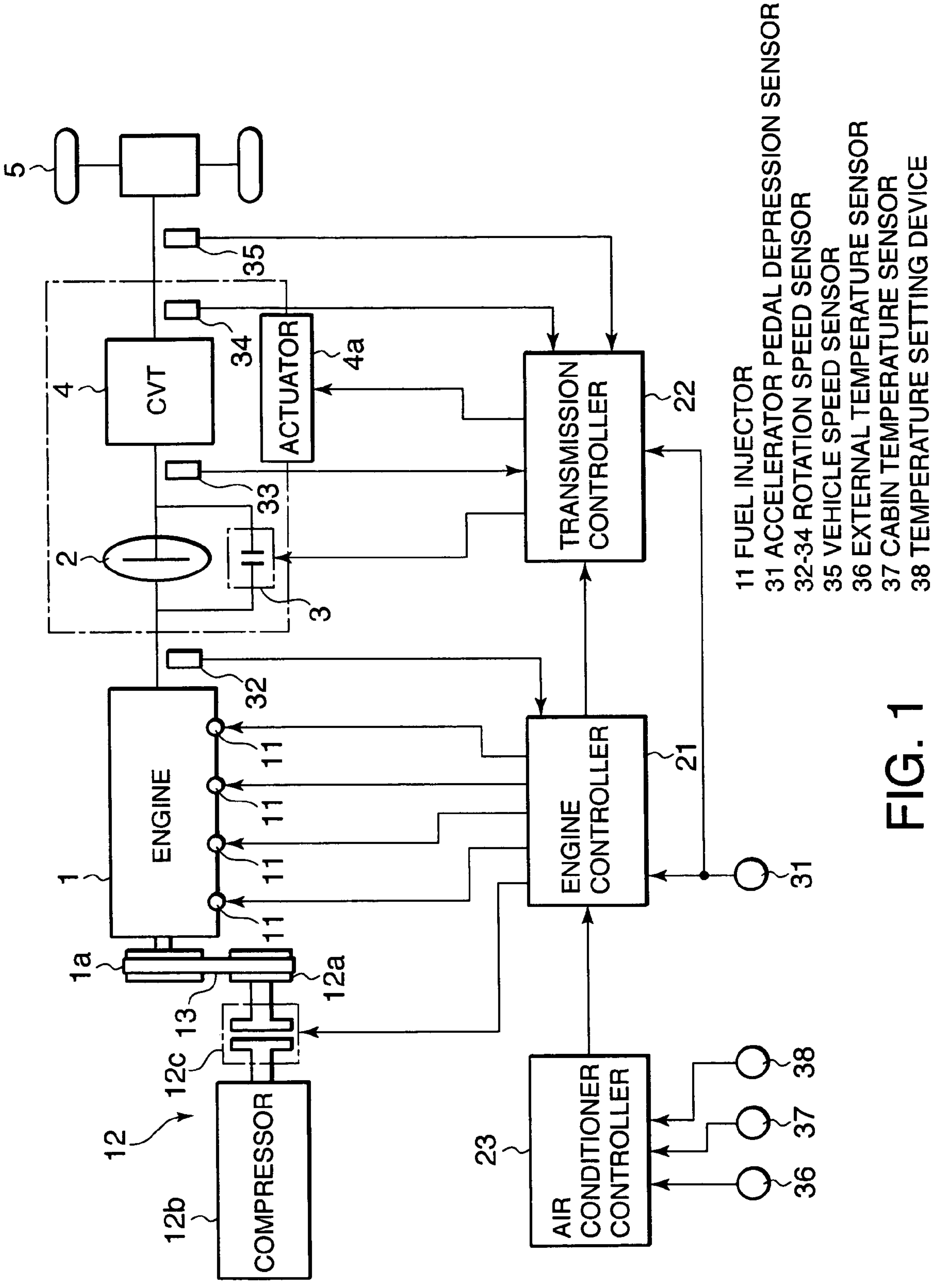
FIG. 1 is a schematic diagram of a control device for a vehicle drive system, according to this invention.

Referring to FIG. 1 of the drawings, in a vehicle drive system, an output torque of an internal combustion engine 1 is output to a continuously variable transmission 4 via a torque converter 2, which includes a lockup clutch 3, and output from the continuously variable transmission 4 is transmitted to drive wheels 5. The internal combustion engine 1 includes fuel injectors 11 for supplying fuel, which are each enclosed in a cylinder.

An air compressor 12*b* for an air conditioner provided in the vehicle is integrally connected to a crank shaft of the internal combustion engine 1 via an electromagnetic clutch 12*c* and a belt 13, which is put on a pair of pulleys 1*a* and 12*a*.

The drive system includes an engine controller 21 which controls the electromagnetic clutch 12*a* and the lockup clutch 3, and also controls the fuel injectors 11 to inject fuel, a transmission controller 22 which controls a speed ratio of the continuously variable transmission 4 via an actuator 4*a*, and an air conditioner controller 23.

These controllers are each constituted by a microprocessor, which includes a central processing unit (CPU), read-only memory (ROM), random access memory (RAM), and an input/output interface (I/O interface). The controllers may also be constituted by multiple microprocessors. Alternatively, all of or any two of the engine controller 21, the transmission controller 22, and the air conditioner controller 23 may be constituted by a single microprocessor.

In order to control the drive system by the controllers 21 through 23, detected data signals from the following various sensors are input to these controllers 21 through 23.

Detected data from an accelerator pedal depression sensor 31, which detects a depression amount of an accelerator pedal of the vehicle, and a rotation speed sensor 32, which detects a rotation speed of the internal combustion engine 1, is input to the engine controller 21. The detected data from the accelerator pedal depression sensor 31 is also input to the transmission controller 22.

Detected data signals from an external temperature sensor 36, a vehicle cabin temperature sensor 37, and a temperature setting device 38 in the vehicle cabin are input to the air conditioner controller 23.

Detected data signals from a rotation speed sensor 33, which detects rotation speed of an input shaft of the continuously variable transmission 4, a rotation speed sensor 34, which detects rotation speed of an output shaft of the continuously variable transmission 4, and a vehicle speed sensor 35, which detects vehicle speed, are input to the transmission controller 22.

The air conditioner controller 23 controls changing of outflow air temperature, outflow air amount, and a changeover of an air intake vent and an air outflow vent with consideration of the external temperature detected by the external temperature sensor 36 and the vehicle cabin temperature detected by the vehicle cabin temperature sensor 37 based on a target temperature set by the temperature setting device 38, so that the vehicle cabin temperature can be a temperature desired by a driver. Furthermore, in the case where the vehicle cabin temperature is higher than the target temperature, an air compressor drive request signal is output to the engine controller 21, and if the vehicle cabin temperature matches the target temperature, an air compressor stop request signal is output to the engine controller 21.

The engine controller 21 performs normal engine control such as control of a throttle opening, fuel injection control of the fuel injectors 11, and control of an ignition timing of an injected fuel, based on a depression amount of the accelerator pedal and the engine rotation speed. Furthermore, an engage operation and a disengage operation of the electromagnetic clutch 12*c* are performed in response to the air compressor drive request signal and the air compressor stop request signal. Moreover, the engine controller 21 determines a disengage condition for the lockup clutch 3, and outputs a lockup clutch disengaging request to the transmission controller 22 according to that determination.

Control of the fuel injectors 11 to inject fuel by the engine controller 21 includes fuel cut control. Fuel cut control includes preventing the fuel injectors 11 from injecting fuel into the cylinders of the internal combustion engine 1 when, for example, the accelerator pedal is released while the vehicle is running, thereby reducing unnecessary fuel consumption.

The control of fuel injectors 11 further includes resuming the fuel injection by the fuel injectors 11 when the engine rotation speed has decreased to a predetermined fuel recovery engine rotation speed or when the vehicle speed has fallen below a predetermined vehicle speed while in a fuel cut state.

The transmission controller 22 sets a speed ratio for the continuously variable transmission 4 based on the vehicle speed and the depression amount of the accelerator pedal. The speed ratio for the continuously variable transmission 4 is controlled via the actuator 4*a* to achieve the target speed ratio.

A map defining a lockup clutch engagement region is pre-stored in the ROM of the microprocessor constituting the transmission controller 22. The transmission controller 22 searches this map based on the vehicle speed and the depression amount of the accelerator pedal, and when the vehicle speed is at least a predetermined vehicle speed VSPu1 while the depression amount of the accelerator pedal is less than a predetermined amount, determines that a running condition of the vehicle is within the lockup clutch engagement region.

In this case, the transmission controller 22 engages the lockup clutch 3 by outputting an engage signal thereto. Meanwhile, if the running condition of the vehicle falls outside of the lockup clutch engagement region, a disengaging signal is output to the lockup clutch 3, which then enters a disengaged state.

In this drive system, while the vehicle is coast running, if the fuel injectors 11 resume fuel injection while the lockup clutch 3 is engaged, at the time when an engine rotation speed Ne decreases and reaches a fuel recovery engine rotation speed, the output torque of the engine 1 may suddenly increase and influence the drive wheels 5, generating a recovery shock.

The engine rotation speed for bringing the lockup clutch 3 into a disengaged state (hereafter referred to as 'a lockup clutch disengaging engine rotation speed') is set higher than the fuel recovery engine rotation speed to prevent a recovery shock. The lockup clutch disengaging engine rotation speed and the fuel recovery engine rotation speed are individually set for driving the air compressor 12*b* and for not driving the same, respectively. However, in either case when the air compressor 12*b* is driven and not driven, setting the lockup clutch disengaging engine rotation speed higher than the fuel recovery engine rotation speed prevents generation of recovery shocks. Difference between the lockup clutch disengaging engine rotation speed and the fuel recovery engine rotation speed is determined in view of a lockup clutch disengaging time for the lockup clutch 3.

Experiments conducted by the inventors have showed that a recovery shock is generated even when the lockup clutch disengaging engine rotation speed and the fuel recovery engine rotation speed are set in this manner.

Referring to FIGS. 2A through 2E, a recovery shock when the lockup clutch disengaging engine rotation speed is set higher than the fuel recovery engine rotation speed will be described.

Figures 2A, 2B, 2C, 2D, 2E:
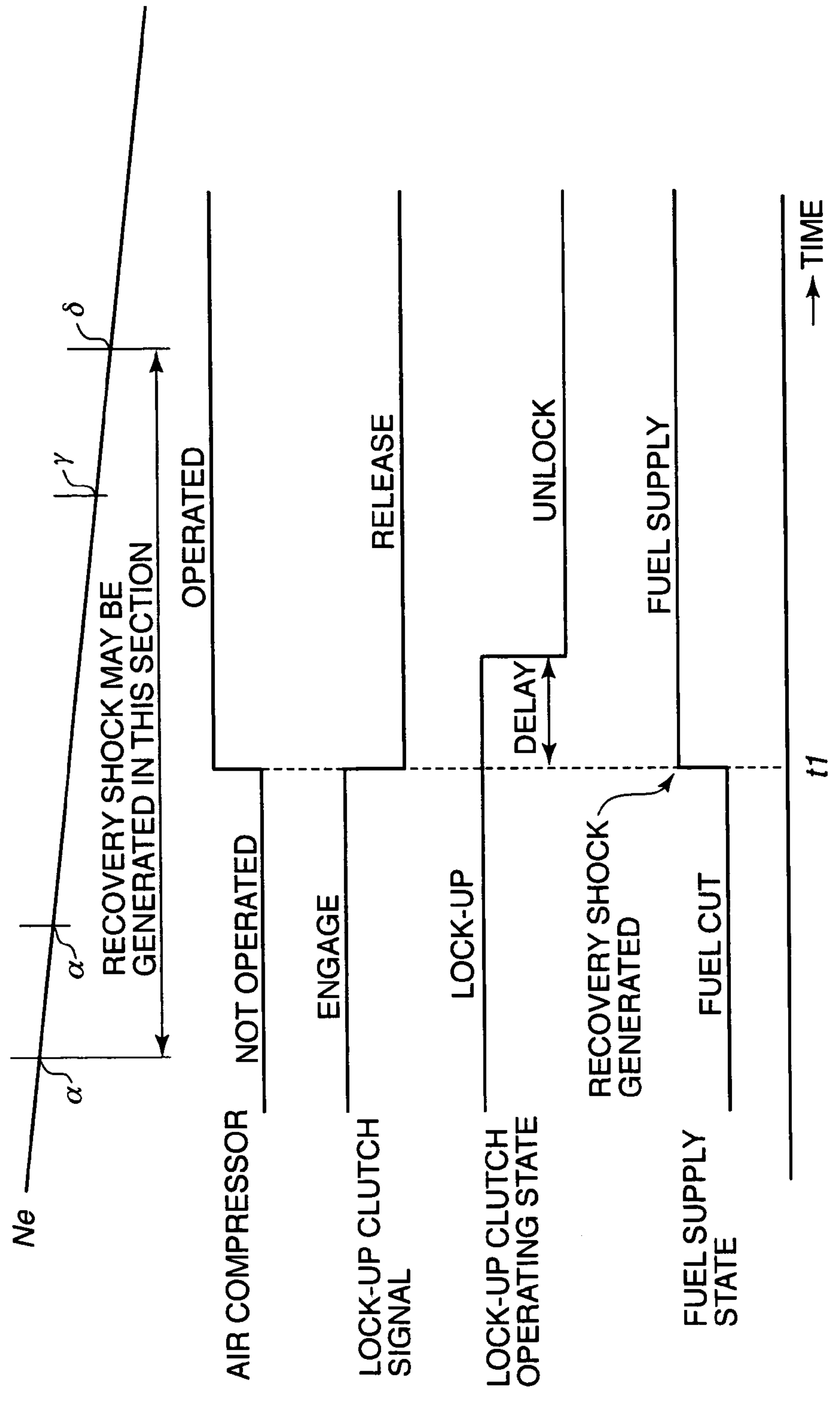
FIGS. 2A through 2E are timing charts describing recovery shock generation patterns.

As shown in FIG. 2A, in the case where the engine rotation speed Ne decreases due to coast running, the lockup clutch disengaging engine rotation speed and the fuel recovery engine rotation speed are set as follows.

α=a lockup clutch disengaging engine rotation speed when the air compressor 12*b* is driven, β=a fuel recovery engine rotation speed when the air compressor 12*b* is driven, γ=a lockup clutch disengaging engine rotation speed when the air compressor 12*b* is not driven, and δ=a fuel recovery engine rotation speed when the air compressor 12*b* is not driven.

As shown in the figures, these speeds have a relationship α>β>γ>δ.

The difference between α and β, and the difference between γ and δ correspond to times from output of respective lockup clutch disengaging request to actual engagement of the lockup clutch 3. According to such setting, a recovery shock does not generate due to resumption of fuel injection irrespective of whether or not the air compressor 12*b* is driven.

However, when the vehicle is coast running under a fuel cut with the air compressor 12*b* in a non-driven state, and the engine rotation speed Ne is decreasing between speed α and speed δ, an air compressor drive request signal may be output from the air conditioner controller 23 to the engine controller 21. As a result, as shown in FIG. 2B, if the air compressor 12*b* starts to operate at time t1, the engine controller 21 immediately outputs a lockup release signal to the transmission controller 22 as shown in FIG. 2C, and concurrently terminates the fuel cut state of the fuel injectors 11, as shown in FIG. 2E, resuming fuel injection.

However, in view of disengagement of the lockup clutch 3, there is a time lag shown in FIG. 2D from output of the lockup clutch disengaging request to actual disengagement of the lockup clutch 3. Due to this time lag, fuel supply is resumed before the lockup clutch is disengaged, thereby generating a recovery shock.

Referring to FIGS. 3A through 3G, control of the drive system, according to this invention, for preventing such recovery shock will now be described.

Figures 3A, 3B, 3C, 3D, 3E, 3F, 3G:
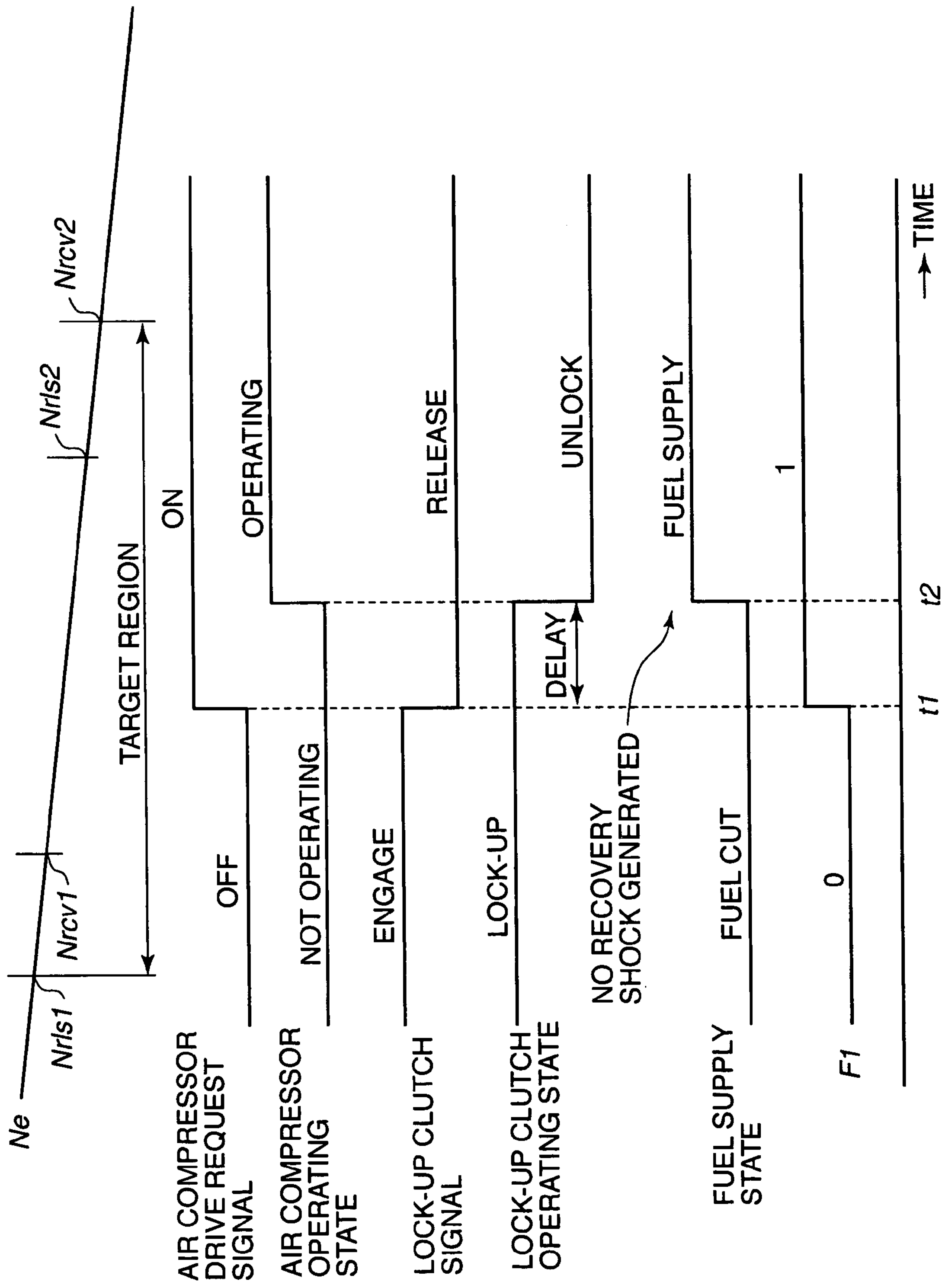
FIGS. 3A through 3G are timing charts describing execution timings of various operations when resuming fuel supply from a fuel cut state under control, according to this invention.

FIG. 3A shows the case where the engine rotation speed Ne decreases in coast running, and herein, the lockup clutch disengaging engine rotation speed and the fuel recovery engine rotation speed are set as follows:

Nrls1=a lockup clutch disengaging engine rotation speed when the air compressor 12*b* is driven, Nrcv1=a fuel recovery engine rotation speed when the air compressor 12*b* is driven, Nrls2=a lockup clutch disengaging engine rotation speed when the air compressor 12*b* is not driven, and Nrcv2=a fuel recovery engine rotation speed when the air compressor 12*b* is not driven.

Nrls1, Nrcv1, Nrls2, and Nrcv2 respectively correspond to α, β, γ, and δ of FIG. 2A, and have a relationship Nrls1>Nrcv1>Nrls2>Nrcv2.

In the following description, Nrls1 denotes a first lockup clutch disengaging engine rotation speed, Nrls2 a second lockup clutch disengaging engine rotation speed, Nrcv1 a first fuel recovery engine rotation speed, and Nrcv2 a second fuel recovery engine rotation speed.

With control of fuel recovery timing, according to this invention, when the vehicle is coast running with the air compressor 12*b* being in a non-driven state and a drive request signal of the air compressor 12*b* is output from the air conditioner controller 23 as shown in FIG. 3B at a time t1, which is midway from Nrls1 to Nrcv2 the engine rotation speed Ne is reducing, the transmission controller 22 immediately outputs a disengaging signal to the lockup clutch 3, but the engine controller 21 does not command the fuel injectors 11 to resume fuel injection until a time t2 when disengagement of the lockup clutch 3 is completed.

The time lag from output of the lockup clutch disengaging request to actual disengagement of the lockup clutch 3 is 150 to 200 milliseconds. Accordingly, a time t2 is determined by adding this time lag to the time t1 when a drive request signal for the air compressor 12*b* is output. The engine controller 21 determines that the disengagement of the lockup clutch 3 has been completed at the time t2 after outputting the lockup clutch disengaging request at the time t1 as shown in FIG. 3D.

Alternatively, completion of disengagement of the lockup clutch 3 may be determined by monitoring a turbine rotation speed of the torque converter 2, namely an input rotation speed Ntb of the continuously variable transmission 4 detected by the rotation speed sensor 33 and an engine rotation speed Ne detected by the rotation speed sensor 32 after the drive request signal for the air compressor 12*b* is output, and then finding difference between Ntb and Ne exceeding a predetermined value.

Based on such determination, by performing engagement of the electromagnetic clutch 12*c* and fuel injection only after the lockup clutch 3 is fully disengaged, even when the air compressor 12*b* is started while coast running as shown in FIGS. 3E and 3F, the electromagnetic clutch 12*c* is engaged and fuel injection is resumed only after a delay corresponding to the lag time for the disengagement of the lockup clutch 3. Accordingly, the air compressor 12*b* can be started and fuel injection can be resumed without generating a recovery shock.

Next, referring to FIGS. 4 and 5, a vehicle drive system control routine executed by the engine controller 21 for implementing the above controls will be described. The engine controller 21 executes this routine at intervals of ten milliseconds while the internal combustion engine 1 is operating.

Figure 5:
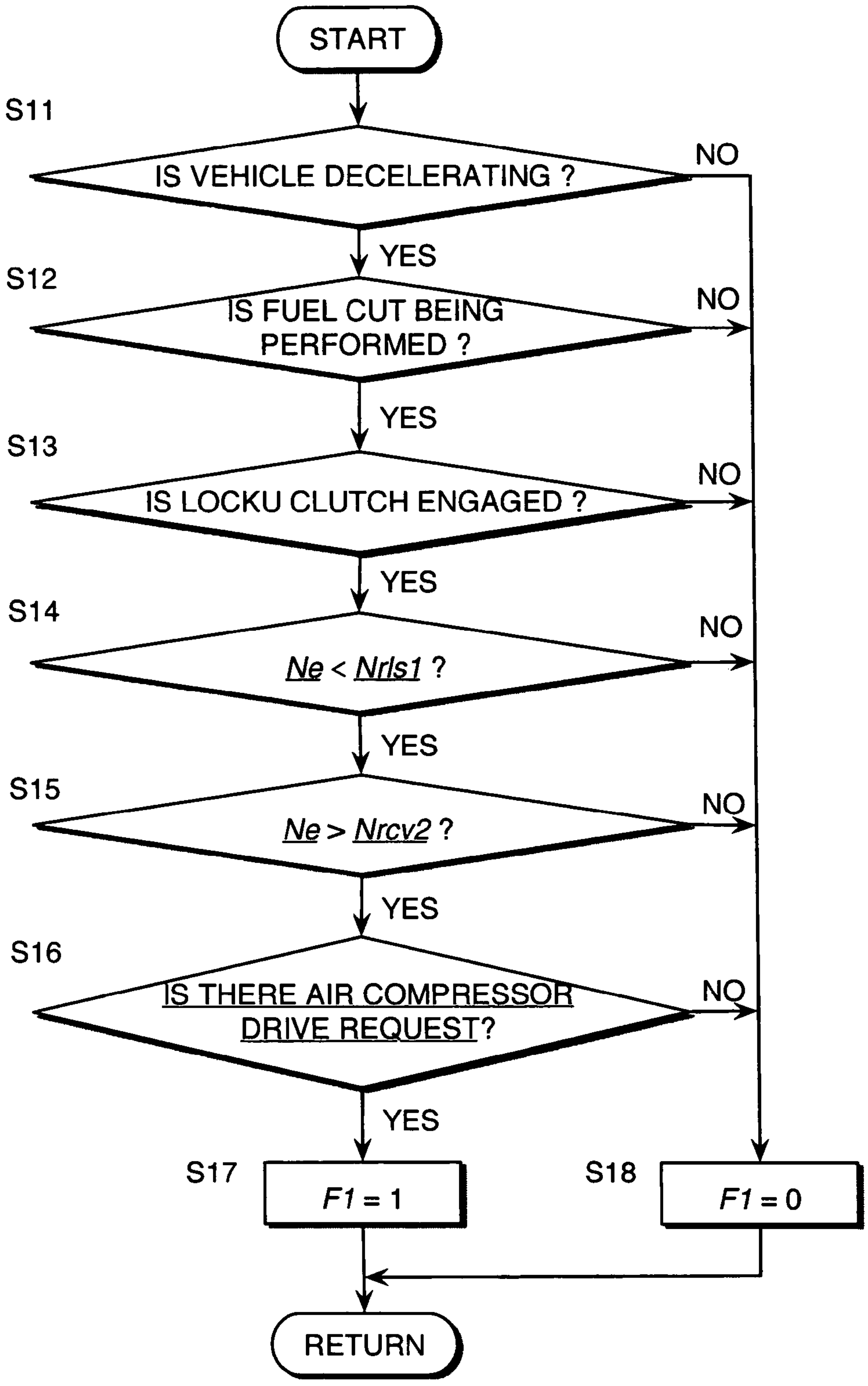
FIG. 5 is a flowchart describing a change-over flag setting subroutine, which is executed by the engine controller.

In a first step S1, the engine controller 21 executes a sub-routine shown in FIG. 5 to set a change-over flag F1.

Referring to FIG. 5, the engine controller 21 determines whether or not each of the following conditions is satisfied in steps S11 to S16.

(1) The vehicle is in a decelerating state.

(2) The internal combustion engine 1 is in a fuel cut state.

(3) The lockup clutch 3 is in an engaged state.

(4) The engine rotation speed Ne is lower than the first lockup clutch disengaging engine rotation speed Nrls1.

(5) The engine rotation speed Ne is higher than the second fuel cut recovery engine rotation speed Nrcv2.

(6) An air compressor drive request signal has been output from the air conditioner controller 23.

The engine controller. 21 determines whether or not each of the above six conditions is affirmative in the steps S11 to S16, and when all the determinations are affirmative, the change-over flag F1 is set to unity in a step S17. In the determinations of the steps S11 to S16, when any one of the determinations is negative, the engine controller 21 sets the change-over flag F1 to zero in the step S18. After the processing of the step S17 or S18, the engine controller 21 terminates the subroutine.

The condition (1) may be determined to be satisfied when a depression amount of the accelerator pedal detected by the accelerator pedal depression sensor 31 is zero. An idle contact, which outputs an ON signal when the depression amount of the accelerator pedal is zero, is preferably provided in the accelerator pedal depression sensor 31 to determine whether or not the condition (1) is satisfied based on the signal from the idle contact.

The condition (2) may be determined to be satisfied when a fuel cut condition is satisfied during fuel injection control of the internal combustion engine 1 performed in another routine. Fuel injection by the fuel injectors 11 is performed based on a fuel injection control signals output from the engine controller 21 to the respective fuel injectors 11, and therefore the engine controller 21 can know whether or not the condition (2) is satisfied.

The condition (3) is determined as follows. Namely, a lockup region for engaging the lockup clutch 3 is defined by a map with vehicle speed and depression amount of the accelerator pedal as parameters. This map is pre-stored in the memory (ROM) of the transmission controller 22, and the transmission controller 22 engages the lockup clutch 3 according to the map when the depression amount of the accelerator pedal is no greater than a predetermined amount and the vehicle speed is at least a predetermined vehicle speed. Accordingly, the engine controller 21 can determine the condition (3) by applying the same criterion or referring to the determination results provided by the transmission controller 22.

The conditions (4) and (5) are directly determined based on the engine rotation speed Ne detected by the rotation speed sensor 32. Respective values of the first lockup clutch disengaging engine rotation speed Nrls1 and the second fuel cut recovery engine rotation speed Nrcv2, which are subjects for determination, are determined in advance through experiment or simulation.

The condition (6) can be directly determined based on a signal input from the air conditioner controller 23 to the engine controller 21.

The change-over flag F1 set by executing the above subroutine holds the following meanings. Namely, F1 equal to unity means that an air compressor drive request signal is output from the air conditioner controller 23 in a state where the lockup clutch 3 is engaged while the vehicle is decelerating within a decelerating period between Nrls1 and Nrcv2 of FIG. 3A and fuel cut is being performed. F1 equal to zero indicates that any one of these conditions is not satisfied.

Referring to FIG. 4 again, once the change-over flag F1 is set to either zero or unity, the engine controller 21 determines in a step S2 whether or not the change-over flag F1 is unity.

When the change-over flag F1 is not unity, the engine controller 21 carries out processing of a step S6. When the change-over flag F1 is unity, the engine controller 21 determines in a step S3 whether or not a change-over flag F1 was zero on the immediately preceding occasion when the routine was executed.

A case where the determination of the step S6 is affirmative means that the change-over flag F1 is changed over from zero to unity when the current routine is executed. In this case, the engine controller 21 outputs a lockup clutch disengaging request for the lockup clutch 3 to the transmission controller 22 in a step S4, and carries out processing of the step S6 after a timer is activated in a step S5. Activation of the timer means that a timer value T is reset to zero.

A case where the determination of the step S6 is negative means that the change-over flag F1 is unity in continuation from the immediately preceding occasion when the routine was executed. In this case, the engine controller 21 determines in a step S7 whether or not the timer value T has reached a predetermined value. The predetermined value corresponds to the aforementioned time lag, and is set to 150 to 200 milliseconds.

When the determination of the step S7 is affirmative, the engine controller 21 determines that disengagement of the been completed, engages the electromagnetic clutch 12*c* and starts the air compressor 12*b* in a step S9, and resumes fuel injection in a step S10. After the processing of the step S10, the engine controller 21 carries out processing of the step S6.

Meanwhile, when the determination of the step S7 is negative, the engine controller 21 determines that disengagement of the lockup clutch 3 is not completed, and increments the timer value T in a step S8. The increment is a value corresponding to a routine executed interval.

In the step S6, the engine controller 21 stores the change-over flag F1 in the memory (RAM), terminating the routine. The value of the change-over flag F1 stored in the RAM is used for the determination of the step S3 on the next occasion when the routine is executed.

According to the above routine execution, even when an air compressor drive request signal is output from the air conditioner controller 23 in a state where the lockup clutch 3 is engaged while a decelerating state of the vehicle is within a decelerating period between Nrls1 and Nrcv2 of FIG. 3A and fuel cut is being performed, the electromagnetic clutch 12*c* is not engaged and fuel injection is not resumed until disengagement of the lockup clutch 3 is completed. This prevents generation of a recovery shock that could not be prevented with the conventional vehicle drive system control algorithms.

Furthermore, since the lockup clutch disengaging engine rotation speed and the fuel recovery engine rotation speed are individually set for the air compressor 12*b* in a driven state and a non-driven state, respectively, a fuel cut region for the air compressor 12*b* in the non-driven state can be set larger than that for the air compressor 12*b* in the driven state, thereby preventing increase in fuel consumption accompanying implementation of this invention.

Figure 6:
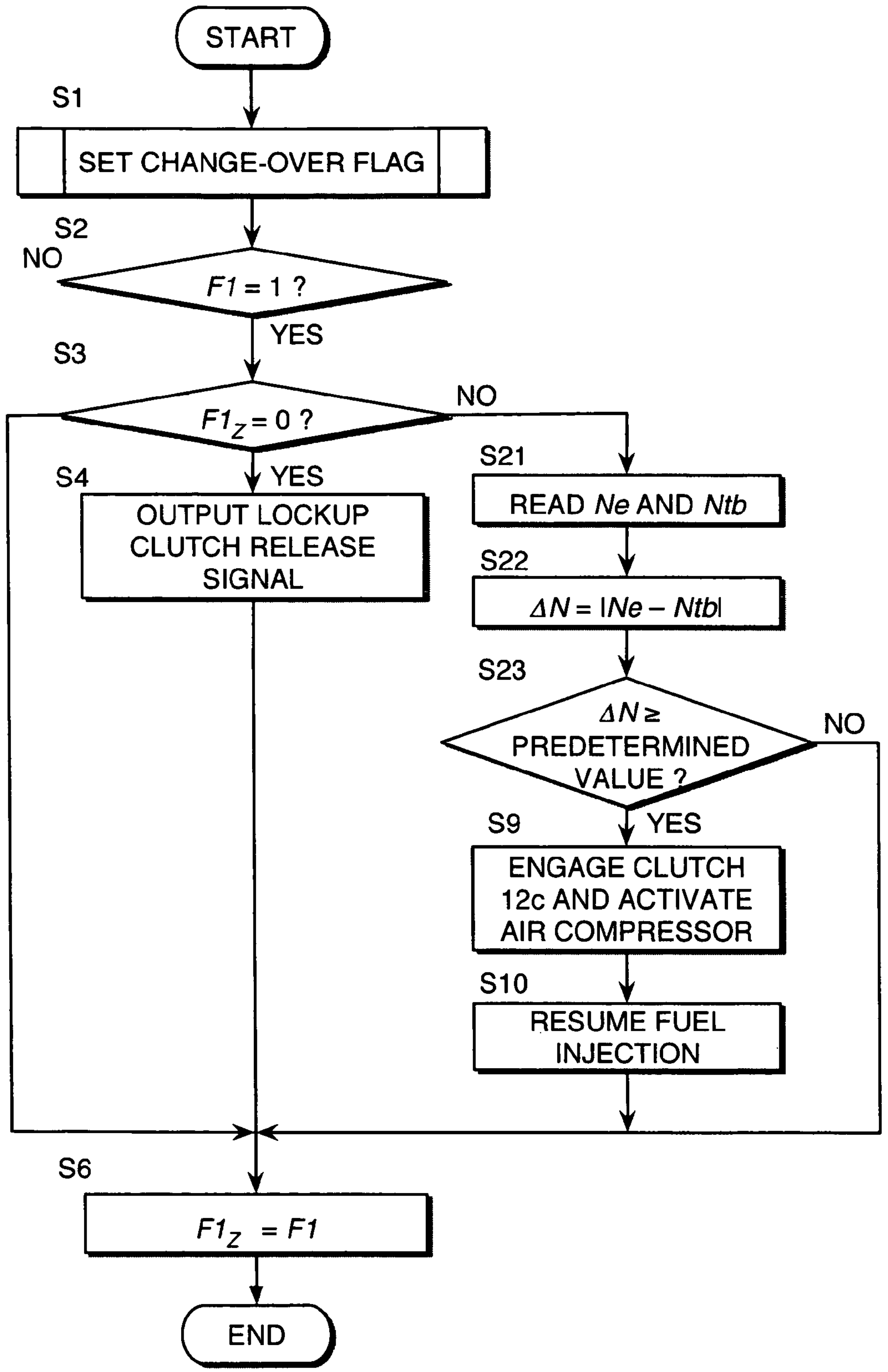
FIG. 6 is similar to FIG. 4, but shows a second embodiment of this invention.

Next, referring to FIG. 6, a second embodiment of this invention regarding a vehicle drive system control routine will be described.

Figure 4:
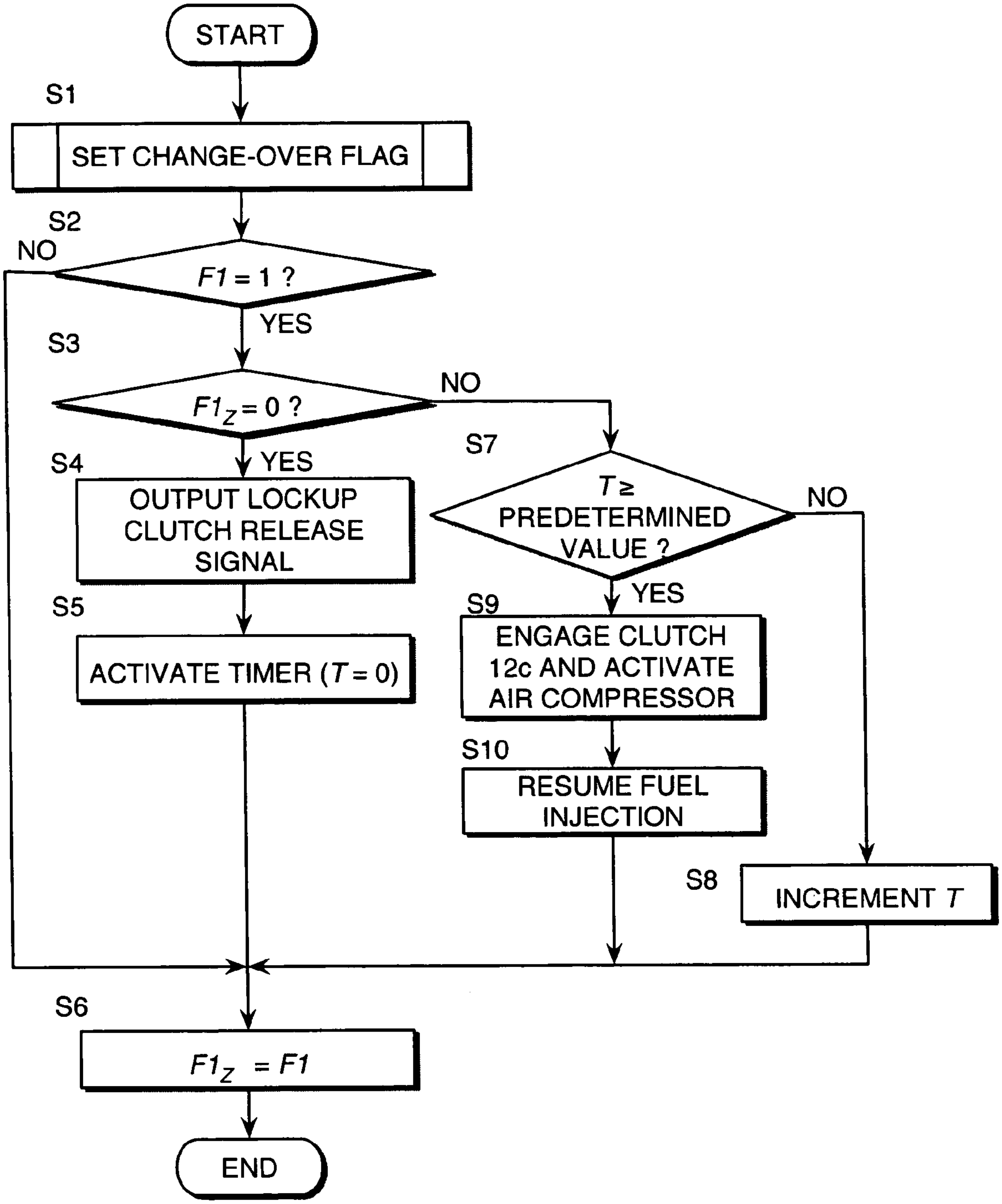
FIG. 4 is a flowchart describing a control routine for a vehicle drive system, which is executed by an engine controller, according to this invention.

This embodiment differs in that a different algorithm is used for the vehicle drive system control routine of FIG. 4 and determination as to whether or not disengagement of the lockup clutch 3 is completed. More specifically, in this embodiment, steps S21 to S23 are provided in place of the steps S5, S7 and S8 in the routine of FIG. 4. The remaining steps are the same as those in the routine of FIG. 4.

As described before, determination as to whether or not disengagement of the lockup clutch 3 has been completed is possible based on the difference between an input rotation speed Ntb of the continuously variable transmission 4 and an engine rotation speed Ne. In this embodiment, this determination algorithm is used for determination as to whether or not disengagement of the lockup clutch 3 has been completed.

The engine controller 21 carries out the following processing when it is determined that the change-over flag F1 shifts from zero to unity for the first time due to this routine executed in the step S3.

First, in the step S21, the engine controller 21 reads in an engine rotation speed Ne and an input rotation speed Ntb of the continuously variable transmission 4.

In the next step S22, an absolute value ΔN of the difference therebetween is calculated.

In the next step S23, it is determined whether or not the absolute value ΔN is greater than a threshold value. When the lockup clutch 3 is in a lockup state or lockup thereof is disengaged, the difference between the input rotation speed Ntb of the continuously variable transmission 4 and the engine rotation speed Ne is small, and the absolute value ΔN is therefore small.

When lockup disengagement is completed, rotational force from the internal combustion engine 1 is transmitted to an input shaft of the continuously variable transmission 4 via the torque converter 2, which allows the input shaft of the continuously variable transmission 4 to relatively rotate within a wide frequency range. As a result, since the absolute value ΔN is greater than the threshold value, the engine controller 21 determines that lockup is completed, and in the steps S9 and S10, resumes engagement of the electromagnetic clutch 12*c* and fuel injection. Otherwise, if the absolute value ΔN is not greater than the threshold value, the engine controller 21 does not carry out these processing. The threshold value is determined in advance through matching.

Even with this embodiment, the same desirable results may be achieved as with the first embodiment in view of recovery shock prevention. Furthermore, with this embodiment, since disengagement completion of the lockup clutch 3 is determined based on a real difference in the rotation speeds of the rotation speed Ne of the engine 1 connected to the lockup clutch 3 and the input rotation speed Ntb of the continuously variable transmission 4, disengagement completion of the lockup clutch 3 can be more precisely determined.

The contents of Tokugan 2004-153006, with a filing date of May 24, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiments, the engine 1 is provided with a plurality of injectors 11, but this invention can be applied to a vehicle drive system in which the engine is provided with only a single fuel injector.

In the second embodiment, the difference of the input rotation speed Ntb of the continuously variable transmission 4 is detected by the rotation speed sensor 33 and the engine rotation speed Ne is detected by the rotation speed sensor 32, in order to calculate the difference between Ntb and Ne. It is however possible to know the difference between Ntb and Ne by using a single sensor which can directly detect the difference between Ntb and Ne.

The embodiments of this invention in which an exclusive property or privilege is claimed are defined as follows:

What is claimed is:

1. A control device for a drive system of a vehicle, the drive system comprising an engine, a transmission, a torque converter which transmits an output torque of the engine to the transmission via a fluid, a lockup clutch which operates between an engaged state in which the engine and the transmission are directly engaged and a disengaged state in which the engine and the transmission are not directly engaged, an accessory driven by the engine in response to an accessory drive request signal, and a fuel supply device which performs and cuts off fuel supply to the engine according to a running condition of the vehicle, the control device comprising:

a programmable controller programmed to:

operate, when the accessory drive request signal has been generated in a state where the fuel supply is cut off and the lockup clutch is in the engaged state, the lockup clutch to enter the disengaged state;

determine whether or not the lockup clutch has been in the disengaged state; and control the engine to start driving the accessory and control the fuel supply device to resume fuel supply, only when the lockup clutch has been in the disengaged state.

2. The control device as defined in claim 1, wherein the lockup clutch is configured to enter the disengaged state when the rotation speed of the engine falls below a lockup clutch disengaging engine rotation speed while the lockup clutch is in the engaged state, and the fuel supply device is configured to resume fuel supply when the rotation speed of the engine falls below a fuel recovery speed that is slower than the lockup clutch disengaging speed during the fuel supply device cutting off fuel supply.

3. The control device as defined in claim 2, wherein the lockup clutch disengaging engine rotation speed is set to different values according to a driving condition of the accessory such that the lockup clutch disengaging engine rotation speed when the accessory is driven is greater than the lockup clutch disengaging engine rotation speed when the accessory is not driven, the fuel recovery engine rotation speed is set to differing values according to the driving condition of the accessory such that the fuel recovery engine rotation speed when the accessory is driven is greater than the fuel recovery engine rotation speed when the accessory is not driven, the fuel recovery engine rotation speed when the accessory is driven is greater than the lockup clutch disengaging engine rotation speed when the accessory is not driven, and a time period during which the fuel supply is cut off and the lockup clutch is in the engaged state corresponds to a time period of decreasing rotation speed of the engine from the lockup clutch disengaging engine rotation speed when the accessory is driven to the fuel recovery engine rotation speed when the accessory is not driven.

4. The control device as defined in claim 1, wherein the controller is further programmed to determine that the lockup clutch has been in the disengaged state when a predetermined time period has elapsed after operating the lockup clutch to enter the disengaged state.

5. The control device as defined in claim 1, wherein the device further comprises a sensor which detects a difference between an input rotation speed and an output rotation speed of the torque converter, the controller is further programmed to determine that the lockup clutch has been in the disengaged state when the difference becomes greater than a predetermined difference after operating the lockup clutch to enter the disengaged state.

6. The control device as defined in claim 1, wherein the accessory comprises an air compressor for use with an air conditioner in a vehicle cabin.

7. The control device as defined in claim 6, wherein the device further comprises a vehicle cabin temperature sensor, which detects a vehicle cabin temperature, and the accessory drive request signal is generated when the vehicle cabin temperature is greater than a predetermined temperature.

8. The control device as defined in claim 1, wherein the state where the fuel supply is cut off and the lockup clutch is in the engaged state includes a state where the vehicle is in a coast running.

9. A control device for a drive system of a vehicle, the drive system comprising an engine, a transmission, a torque converter which transmits an output torque of the engine to the transmission via a fluid, a lockup clutch which operates between an engaged state in which the engine and the transmission are directly engaged and a disengaged state in which the engine and the transmission are not directly engaged, an accessory driven by the engine in response to an accessory drive request signal, and a fuel supply device which performs and cuts off fuel supply to the engine according to a running condition of the vehicle, the control device comprising:

means for operating, when the accessory drive request signal has been generated in a state where the fuel supply is cut off and the lockup clutch is in the engaged state, the lockup clutch to enter the disengaged state;

means for determining whether or not the lockup clutch has been in the disengaged state; and means for controlling the engine to start driving the accessory and controlling the fuel supply device to resume fuel supply, only when the lockup clutch has been in the disengaged state.

10. A control method for a drive system of a vehicle, the drive system comprising an engine, a transmission, a torque converter which transmits an output torque of the engine to the transmission via a fluid, a lockup clutch which operates between an engaged state in which the engine and the transmission are directly engaged and a disengaged state in which the engine and the transmission are not directly engaged, an accessory driven by the engine in response to an accessory drive request signal, and a fuel supply device which performs and cuts off fuel supply to the engine according to a running condition of the vehicle, the control method comprising:

operating, when the accessory drive request signal has been generated in a state where the fuel supply is cut off and the lockup clutch is in the engaged state, the lockup clutch to enter the disengaged state;

determining whether or not the lockup clutch has been in the disengaged state; and controlling the engine to start driving the accessory and controlling the fuel supply device to resume fuel supply, only when the lockup clutch has been in the disengaged state.

* * * * *